(12) United States Patent
Ayyagari et al.

(10) Patent No.: US 6,894,991 B2
(45) Date of Patent: May 17, 2005

(54) INTEGRATED METHOD FOR PERFORMING SCHEDULING, ROUTING AND ACCESS CONTROL IN A COMPUTER NETWORK

(75) Inventors: Deepak V. Ayyagari, Watertown, MA (US); Anthony Ephremides, North Bethesda, MD (US)

(73) Assignees: Verizon Laboratories Inc., Waltam, MA (US); Genuity, Inc., Cambridge, MA (US)

( * ) Notice: Subject to any disclaimer, the term of this patent is extended or adjusted under 35 U.S.C. 154(b) by 861 days.

(21) Appl. No.: 09/727,926

(22) Filed: Nov. 30, 2000

(65) Prior Publication Data

US 2002/0101822 A1 Aug. 1, 2002

(51) Int. Cl.⁷ .......................... H04J 3/16; H04L 12/28; H04Q 7/00; G06F 15/16; G06F 15/173
(52) U.S. Cl. ................... 370/325; 370/254; 370/331; 370/468; 709/224; 709/249
(58) Field of Search .................. 370/31–331, 408–468, 370/345, 355; 455/446–449, 450–453; 709/224–229, 249, 250

(56) References Cited

U.S. PATENT DOCUMENTS

| | | | | |
|---|---|---|---|---|
| 5,412,654 A | * | 5/1995 | Perkins | 370/312 |
| 5,613,206 A | | 3/1997 | Bantz et al. | 455/34.1 |
| 5,618,045 A | | 4/1997 | Kagan et al. | 463/40 |
| 5,729,680 A | | 3/1998 | Belanger et al. | 395/200.1 |
| 5,740,363 A | | 4/1998 | Siep et al. | 395/200.3 |
| 5,822,309 A | | 10/1998 | Ayanoglu et al. | 370/315 |
| 5,923,659 A | | 7/1999 | Curry et al. | 370/401 |
| 5,987,011 A | * | 11/1999 | Toh | 370/331 |
| 5,987,024 A | | 11/1999 | Duch et al. | 370/350 |
| 6,026,303 A | | 2/2000 | Minamisawa | 455/446 |
| 6,028,853 A | | 2/2000 | Haartsen | 370/338 |
| 6,058,107 A | * | 5/2000 | Love et al. | 370/332 |
| 6,304,556 B1 | * | 10/2001 | Haas | 370/254 |
| 6,307,843 B1 | * | 10/2001 | Okanoue | 370/312 |
| 6,385,174 B1 | * | 5/2002 | Li | 370/252 |
| 6,456,599 B1 | * | 9/2002 | Elliott | 370/254 |
| 6,493,759 B1 | * | 12/2002 | Passman et al. | 709/227 |
| 6,512,935 B1 | * | 1/2003 | Redi | 455/574 |
| 6,647,413 B1 | * | 11/2003 | Walrand et al. | 709/224 |
| 6,678,252 B1 | * | 1/2004 | Cansever | 370/253 |
| 6,735,448 B1 | * | 5/2004 | Krishnamurthy et al. | 455/522 |

OTHER PUBLICATIONS

Jing–yu Qiu and Edward W. Knightly, Inter–Class Resource Sharing using Statistical Service Envelopes, IEEE 0–7803–5417–6/99, Jun. 1999, pp. 1404–1410.

Sally Floyd, Link–sharing and Resource Management Models for Packet Networks, IEEE/ACM Transactions on Networking, vol. 3, No. 4, Aug. 1995, pp. 365–386.

Thyagarajan Nandagopal, Songwu Lu and Vaduvur Bharghavan, A Unified Architecture for the Design and Evaluation of Wireless Fair Queueing Algorithms, Proc. Of ACM MOBICOM, 1999, pp. 132–142.

(Continued)

*Primary Examiner*—Man U. Phan
(74) *Attorney, Agent, or Firm*—Leonard C. Suchtya, Esq.; Joel Wall, Esq.; Rader, Fishman & Grauer

(57) ABSTRACT

An integrated highly adaptive method is presented to perform scheduling, routing and access control in a network. The network is made up of a plurality of nodes interconnected by links between at least some of the nodes wherein at least one path interconnects all of the plurality of nodes. The nodes are organized into at least one of a cluster and a clique and the network has a network-wide capacity to send data packets in slots delineating time frames on the network between the nodes on the network defined by the links. The plurality of nodes can be configured to process at least one flow comprising at least a portion of a transmitted and received data packet for which the plurality of nodes must manage to get the data packets to a desired node on the network.

36 Claims, 10 Drawing Sheets

OTHER PUBLICATIONS

Jorg Liebeherr, Dallas E. Wrege and Domenico Ferrari, Exact Admission Control for Networks with a Bounded Delay Service, IEEE/ACM Transactions on Netowrking, vol. 4, No. 6, Dec. 1996, pp. 885–901.

Abhay K. Parekh and Robert G. Gallager, A Generalized Processor Sharing Approach to Flow Control in Integrated Services Networks: The Multiple Node Case, IEEE/ACM Transactions on Networking, vol. 2, No. 2, Apr. 1994, pp. 137–150.

Pawan Goyal and Harrick M. Vin, Generalized Guaranteed Rate Scheduling Algorithms: A Framework, IEEE/ACM Transactions on Networking, vol. 5, No. 4, Aug. 1997, pp. 561–571.

Pawan Goyal, Harrick M. Vin and Haichen Cheng, Start–Time Fair Queueing: A Scheduling Algorithm for Integrated Services Packet Switching Networks, IEEE/ACM Transactions on Networking, vol. 5, No. 5, Oct. 1997, pp. 690–704.

Michael B. Pursley, Harlan B. Russell and Peter E. Staples, Routing Multimedia Packets in a Frequency–Hop Packet Radio Network, IEEE, 0–7803–3682–8/96, Aug. 1996, pp. 200=224.

Deepak Ayyagari, Anastassios Michail and Anthony Ephremides, IEEE, 0–7803–5718–3/00, Mar. 2000, pp. 380–384.

Advanced Telecommunications & Information Distribution Research Program; Factor 1—Wireless Battlefield Digital Communications (WBDC); $2^{nd}$ Quarter FY99 Report; Consortium Lead, Mr. Scott Chuprun; ARL Lead, Dr. Don Torrieri; pp. 1-1-1-71.

* cited by examiner

US 6,894,991 B2

INTEGRATED METHOD FOR PERFORMING SCHEDULING, ROUTING AND ACCESS CONTROL IN A COMPUTER NETWORK

STATEMENT REGARDING FEDERALLY SPONSORED RESEARCH OR DEVELOPMENT

This invention was made with Government support under Contract No. DAAL01-96-2-0002, awarded by the U.S. Army. The Government has certain rights in this invention.

BACKGROUND OF THE INVENTION

1. Field of the Invention

The invention relates to a method for performing scheduling, routing and access control in a computer network and, more specifically, a method for performing scheduling, routing and access control in an ad hoc wireless network.

2. Description of the Related Art

Computer networks based upon a series of nodes and servers interconnected by physical wiring have been well known for some time (e.g., an Ethernet or a Token-ring network). With the rapid development of the Internet, these computer networks must not only communicate effectively within their own domain or environment, but also must communicate between networks of different types.

An example of a prior art physical wire-based wide-area network 10 is shown in FIG. 1 comprising a first local area network 12 having several nodes 14 interconnected by a wire-based network 16. A network sever 18 located on the first local area network 12 is interconnected to a Central Telephone Office (CTO) box 20 for interconnection of the local area network 12 to a Public Switched Telephone Network (PSTN), or a world wide network more commonly known as the Internet 22. A second local area network 24 is also interconnected to the Internet 22, via a web server 26 through a second CTO box 28. The second local area network 24 also can have several nodes 30 thereon.

A reference model for Open Systems Interconnection (OSI) has been defined by the International Standardization Organization (ISO) to put names to the different tasks a computer network has to fulfill to order to perform these inter-network types of communications. An example of such an inter-network communication is shown by a dashed arrow "A" in FIG. 1 for communication between a node 14 on the first local area network 12 and a node 30 on the second local area network 24.

The ISO model defines seven layers, providing a logical grouping of the network functions. This model is good for teaching, and for planning the implementation of a computer network. Furthermore, dividing functionality in defined layers has the advantage that different parts of the network can be provided from different vendors and still work together.

As schematically illustrated in FIG. 2 and described in greater detail below, the OST network protocol 40 has seven generally independent layers: the physical layer 42, the link layer 44, the network layer 46, the transport layer 48, the session layer 50, the presentation layer 52 and the application layer 54.

The physical layer 42 is responsible for converting the stream of digital bits from the layers above to a physical stream capable of being transported between two nodes on whatever physical medium happens to comprise the network (e.g., wires, cables, radio, light, etc.). The link layer 44 is responsible for carrying packets across a link (i.e., a network interconnection) between two nodes and making sure that the packets are not damaged, and that they arrive in the correct order. The network layer 46 transmits those packets from one node to another across the network, and the organization of such a network, possibly consisting of several independent physical networks typically via a global unique address structure.

The transport layer 48 transports data from one program to another across a network and typically also always includes another level of addressing (e.g., network sockets). While Quality of Service (QoS) is often defined at this layer, the broader definition of QoS includes metrics such as delay and bit loss or packet loss at the previous three layers (physical, link and network). The remaining three layers 50–54 (i.e., session layer 50, presentation layer 52 and application layer 54) are of less relevance when addressing networking concerns since these three layers 50–54 essentially relate to how a particular node on a network processes data received by the four underlying layers 42–48 (i.e., physical layer 42, link layer 44, network layer 46 and transport layer 48).

The conventional wisdom in transmitting packets of data across networks was to essentially isolate each of the layers 42–54 of the OSI protocol 40. For example, information/data generated by a node for transmission to another node via the session, presentation and application layers 50–54 are passed into a "virtual pipe" between a pair of nodes (such as a client and a server in a conventional wire-based network) created by the transport layer 48. The data are then handed off to the network layer 46 which decides the route the data will take to their specified destination, i.e., the network layer performs the "routing" function of getting data from one node to another. The link layer 44 then takes over and determines how much available capacity on the network a particular node will be granted for transmissions and how this capacity is distributed among multiple data flows at the emanating or terminating at the node, handles error checking on the transmission and receipt of the data packets and arbitrates between multiple nodes attempting to transmit packets. These functions, typically performed by the link layer 44, are referred to commonly as "scheduling", i.e., which flow within which node gets to transmit, at what time and for how long, and "access control", i.e., when new nodes are granted rights to transmit or allowed to request bandwidth.

Quality of Service (or QoS) is generally measured to determine whether these scheduling, routing and access control functions are being performed adequately by a network. Two performance metrics, i.e., throughput and delay, are typically measured to provide specific criteria as to the QoS provided by the network. Throughput measures the "effective traffic" on the network, generally in the number of bits transmitted over the network over time between a pair of points on the network. Delay measures the time it takes to transmit the data between these two points. In this application, the indicator $X_n$ is used to indicate the throughput rate (typically in bits/sec) of a particular network at node n and the indicator $\delta_n$ is used to indicate the delay in seconds in packet transmission. Obviously, for a network to be effective, its routing, scheduling and access control algorithms should be designed to maximize throughput ($X_n$) and minimize delay ($\delta_n$) for each node on the network.

Thus, with the conventional wisdom outlined above, the routing decisions made at the network layer 46 were made independent of the access control and scheduling protocols made at the link layer 44. In addition, virtually no consideration was made in the conventional wisdom of computer networking with regard to the physical layer 42 (as described in the OSI protocol 40) because of the high capacities and reliabilities of the media used in typical wire-based networks such as that shown in FIG. 1.

This type of designed independence between the network layer 46, the link layer 44 and the physical layer 42 has some drawbacks even in the generally reliable wire-based networking environment. For example, because node-to-node routing decisions of the network layer 46 are made independent of capacity assignments of the access control and scheduling protocols of the link layer 44, data on the network may be routed through busy nodes on the network (i.e., the node though which data is routed does not have the capacity to handle the data packet) and new high-capacity, free nodes on the network may not be considered by the routing decisions of the network layer 46. In both of these situations, throughput ($X_n$) would decrease and delay ($\delta_n$) would increase. The converse of this drawback is also true in that access control and scheduling decisions made at the link layer 44 are made unaware (i.e., independent) of variations in link load (i.e., a particular path between a pair of nodes) resulting from route assignments made at the network layer 46. In either case, QoS is certainly adversely affected.

Further, changes in the network topology and the ability of particular links between nodes to transmit data (i.e., link quality) affect the capacity of a particular link to transmit data effectively. Independent decisions made in routing and access control algorithms would not account for this situation as well.

These problems are exacerbated when the network includes wireless elements, and especially in an ad hoc wireless network, shown by example in FIG. 3 wherein an ad hoc wireless network 60 comprises several disparate nodes 62 interconnected by wireless links 64. It will be understood that the nodes 62 in an ad hoc wireless network 60 are typically formed into a clique, shown by phantom outline 66 in FIG. 3 wherein a subset of nodes on the network 60 can each communicate with every other node in the clique 66, or a cluster, shown by phantom outline 68 in FIG. 3 wherein at least one node 62 in a subset of nodes on the network 60 can communicate with every other node in the cluster 68.

In the wireless network 60, the predefined "links" between nodes on the network are less defined than with physical high-capacity, low-error rate wires as in the network 10 shown in FIG. 1. In a wireless network 60, the links 64 are aware of one another by cliquing or clustering algorithms which form the often transient cliques 66 and clusters 68 on the wireless network 60.

However, the great benefits of wireless networks 60, in that nodes 62 can be easily "dropped" into place and immediately formed into a wireless network and that they can be immediately and dynamically reconfigured in location, also provide the greatest difficulties for performing scheduling, routing and access control on them. In addition to the drawbacks of independently making the scheduling, routing and access control decisions as indicated by the convention wisdom of the OSI protocol 40 as outlined above, several additional problems surface when these independent scheduling, routing and access control decisions are made in a wireless environment.

For example, in addition to nodes 62 being moveable on the network 60, nodes 62 can be added or deleted to and from the network 60 without notice to the other nodes and the scheduling, routing and access control decisions of prior art systems cannot adapt. The network layer 46 in prior art wireless systems cannot make effective routing decisions because the nodes 62 can change often in presence and location. The link layer 44 cannot adapt to changing topology since convention access control and scheduling decisions are generally made on a presumed topology for the network. Finally, since the physical layer 42 is generally presumed to be a high-capacity medium in prior art networking environments, changes in the bandwidth or even elimination of bandwidth on particular nodes 62 or links 64 of a wireless network 60 cause independently-made scheduling, routing and access control decisions to fail in the unpredictable medium of a wireless environment (i.e., unpredictable and highly variable in errors and capacity).

In summary, the prior art wire-based and wireless networking schemes that make independent scheduling, routing and access control decisions in the corresponding physical layer 42, link layer 44 and network layer 46 are unable to adapt efficiently to an ad hoc wireless network environment. The prior art cannot adapt adequately to the dynamic reconfiguration of an ad hoc wireless network and it cannot account for the wide variations of the physical medium, namely a wireless channel.

SUMMARY OF THE INVENTION

The invention described herein overcomes the limitations of the prior art by providing a new protocol for making scheduling, routing and access control decisions by integrating the characteristics of the physical layer, the link layer and the network layer in a networked computer environment that maximizes QoS.

In one aspect, the invention relates to an integrated highly adaptive method to perform scheduling, routing and access control in a network. The network is made up of a plurality of nodes interconnected by links between at least some of the nodes wherein at least one path interconnects all of the plurality of nodes. The nodes are organized into at least one of a cluster and a clique and the network has a network-wide capacity to send data packets in slots delineating time frames on the network between the nodes on the network defined by the links. The plurality of nodes can be configured to process at least one flow comprising at least a portion of a transmitted and received data packet for which the plurality of nodes must manage to get the data packets to a desired node on the network.

The method comprises the steps of allocating the network-wide capacity among each of the nodes in the at least one of a cluster and a clique at the beginning of a time frame on the network, wherein the network-wide capacity allocated to each of the nodes in the at least one of a cluster and a clique is performed based upon at least one node-level performance metric of the network; and repeating the capacity allocating step at the beginning of each time frame.

In various embodiments of the invention, the method can further comprise the step of allocating the capacity allocated to each node in the at least one of a cluster and a clique among each of the flows associated with that node at the beginning of a time frame on the network, wherein the capacity allocated to each of the flows in the node is performed based upon at least one flow-level performance metric of the network. The method can also comprise the step of routing the flow associated with each node to a neighboring node. The routing step can further comprise the step of computing all possible routes of that a flow can take to its destination and selecting a desired route based upon at least one routing performance metric of the network. The routing step can further comprises the step of selecting the neighboring node for each flow of each node that lies on the desired route. The at least one node-level performance metric can comprise a measure of the backlog of packets to be sent by a node and the node-level performance metric is measured independently for each node in the at least one of a cluster and a clique.

At least one node-level performance metric can further comprise a measure of the link errors experienced in the previous time frame by a node and the performance metric is measured independently for each node in the at least one of a cluster and a clique. The at least one flow-level performance metric can comprise a measure of the backlog of packets to be sent by a node and the node-level performance metric is measured independently for each node in the at least one of a cluster and a clique. The at least one flow-level performance metric can further comprise a measure of the link errors experienced in the previous time frame by a node and the performance metric is measured independently for each node in the at least one of a cluster and a clique. The step of allocating the capacity of the network can further comprise the step of calculating a link error adjusted rate for each node in the at least one of a cluster and a clique, wherein the link error adjusted rate is representative of the node-level performance metric.

The method can further include the step of calculating a weighting value for each node corresponding to a representative portion of the link error adjusted rate of the node as compared with the sum of the link error adjusted rate for the corresponding at least one of a cluster and a clique. The method can also comprise the step of allocating capacity among the nodes in the at least one of a cluster and a clique by integrally calculating the product of the capacity of the at least one of a cluster and a clique with the weighting value for each node. In addition, the method can include the step of determining whether any of the capacity of the at least one of a cluster and a clique remains unallocated among the nodes of the at least one of a cluster and a clique.

The method can further comprise the step of allocating any unallocated capacity to a node having a highest weighting value from a previous iteration if the unallocated capacity is less than a predetermined threshold value. The step of allocating the capacity of the node can further comprise the step of calculating a link error adjusted rate for each flow in the node, wherein the link error adjusted rate is representative of the flow-level performance metric. The method can further comprise the step of calculating a weighting value for each flow corresponding to a representative portion of the link error adjusted rate of the flow as compared with the sum of the link error adjusted rate for the corresponding node. The method can further comprise the step of allocating capacity among the flows in the node by integrally calculating the product of the capacity of the node with the weighting value for each flow. The method can further comprise the step of determining whether any of the capacity of the node remains unallocated among the flows of the node. The method can further comprise the step of allocating any unallocated capacity to a flow having a highest weighting value from a previous iteration if the unallocated capacity of the node is less than a predetermined threshold value.

The method can further comprise the step of computing a most efficient route for each flow based upon the at least one routing performance metric of the network. The routing performance metric can comprise the sum of the time frame length divided by the capacity allocated to each node along the route, and the selected route comprises the minimum of the routing performance metric. The method can further comprise the step of determining a neighboring node to the flow corresponding to the desired route.

In another aspect, the invention relates to a highly adaptive integrated network capable of performing scheduling, routing and access control in a network comprising at least a physical layer, a link layer and a network layer made up of a plurality of nodes interconnected by links between at least some of the nodes. At least one path interconnects all of the plurality of nodes, wherein the nodes are organized into at least one of a cluster and a clique. The network has a network-wide capacity to send data packets in slots delineating time frames on the network between the nodes on the network defined by the links. The plurality of nodes are configured to process at least one flow, a flow comprising at least a portion of a transmitted and received data packet for which the plurality of nodes must manage to get the data packets to a desired node on the network.

The improvement in a network protocol described herein comprises the at least a physical layer, a link layer and a network layer being interdependently integrated with one another by at least one of scheduling, routing, and access control decisions in a current time frame being made by relying on at least one of scheduling, routing and access control decisions made in a previous time frame.

In various embodiments of this aspect of the invention, the physical layer can be a wireless medium and/or a wire-based medium. At least one of the physical layer, the link layer and the network layer can incorporate a node-level scheduling routine for allocating capacity among the plurality of nodes of the network. At least one of the physical layer, the link layer and the network layer can incorporate a flow-level scheduling routine for allocating capacity of the plurality of nodes among the at least one flow corresponding to a node of the plurality of nodes. The network layer can incorporate a routing routine for determining a destination for the at least one flow of the plurality of nodes of the network based upon a characteristic of at least one of the physical layer and the link layer.

Other objects, features, and advantages of the invention will be apparent from the ensuing description in conjunction with the accompanying drawings.

Figure 1:
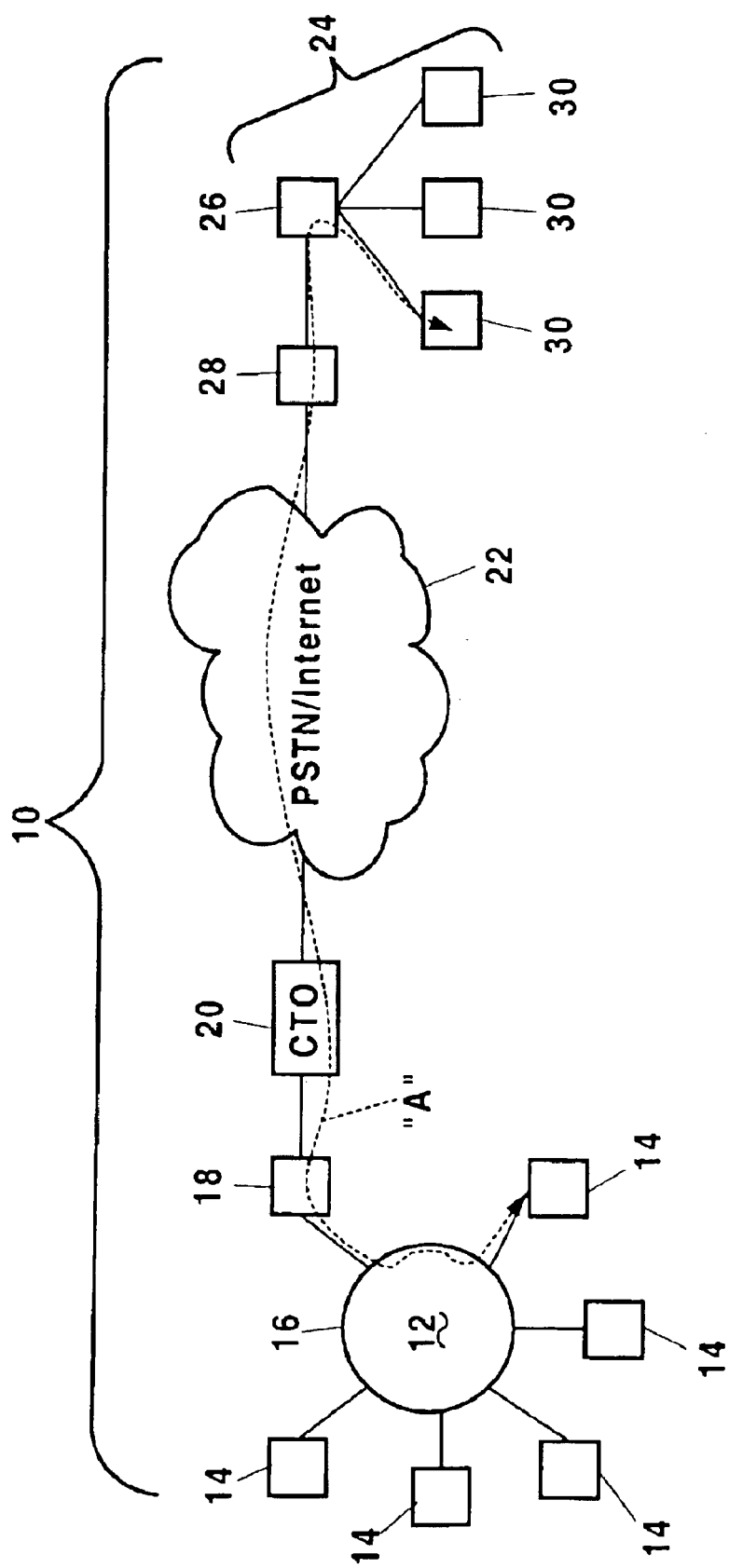
FIG. 1 is a schematic representation of a prior art physical wire-based computer network showing, by example, a first local area network interconnected to a second local area network by the Internet.
Figure 2:
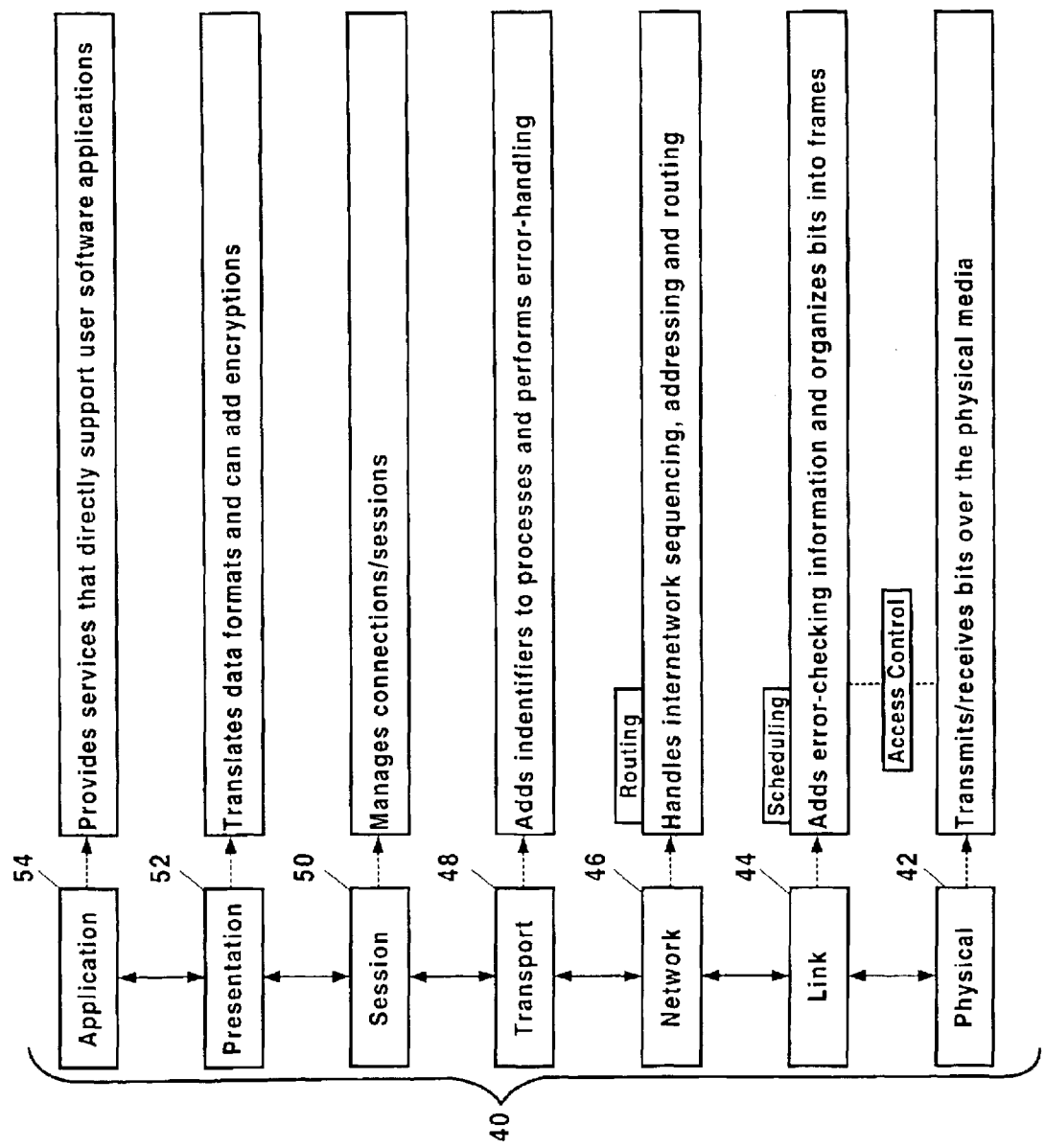
FIG. 2 is a block diagram outlining the OSI protocol of seven distinct layers in convention networking design typically employed in implementing prior art networking layers such as that shown in FIG. 1.
Figure 3:
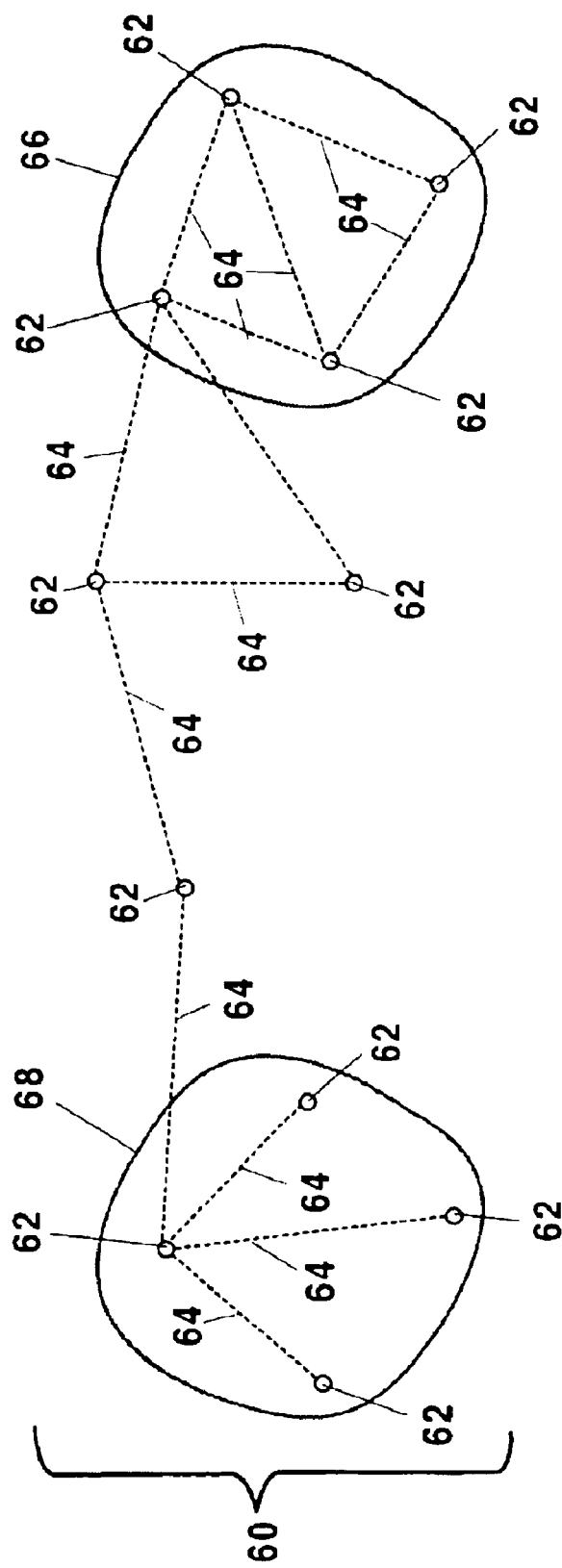
FIG. 3 is a schematic representation of an ad hoc wireless network comprised of multiple nodes interconnected by wireless links wherein groups of nodes are algorithmically organized into either clusters or cliques.
Figure 4:
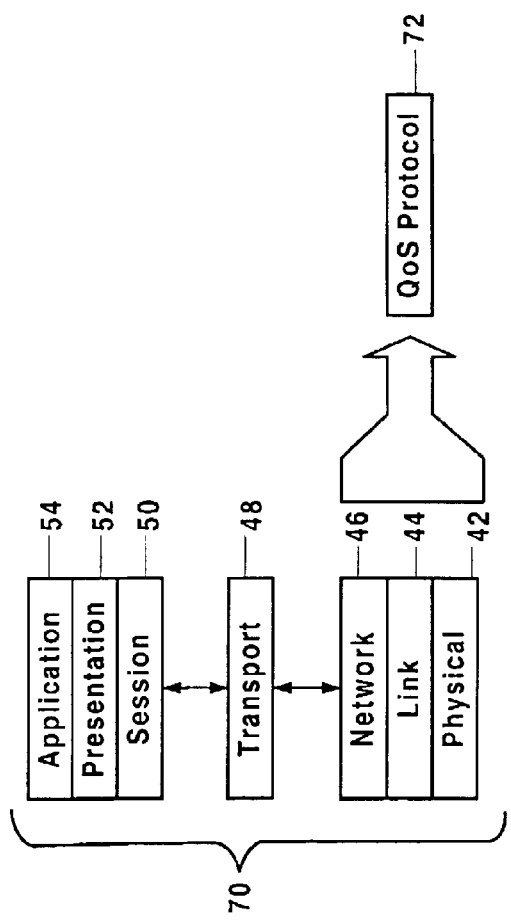
FIG. 4 is a schematic representation of the OSI protocol of FIG. 2 wherein the lower three layers, i.e., the physical layer, the link layer and the network layers are integrated into a single protocol for performing scheduling, routing and access control in an ad hoc wireless network.
Figure 7:
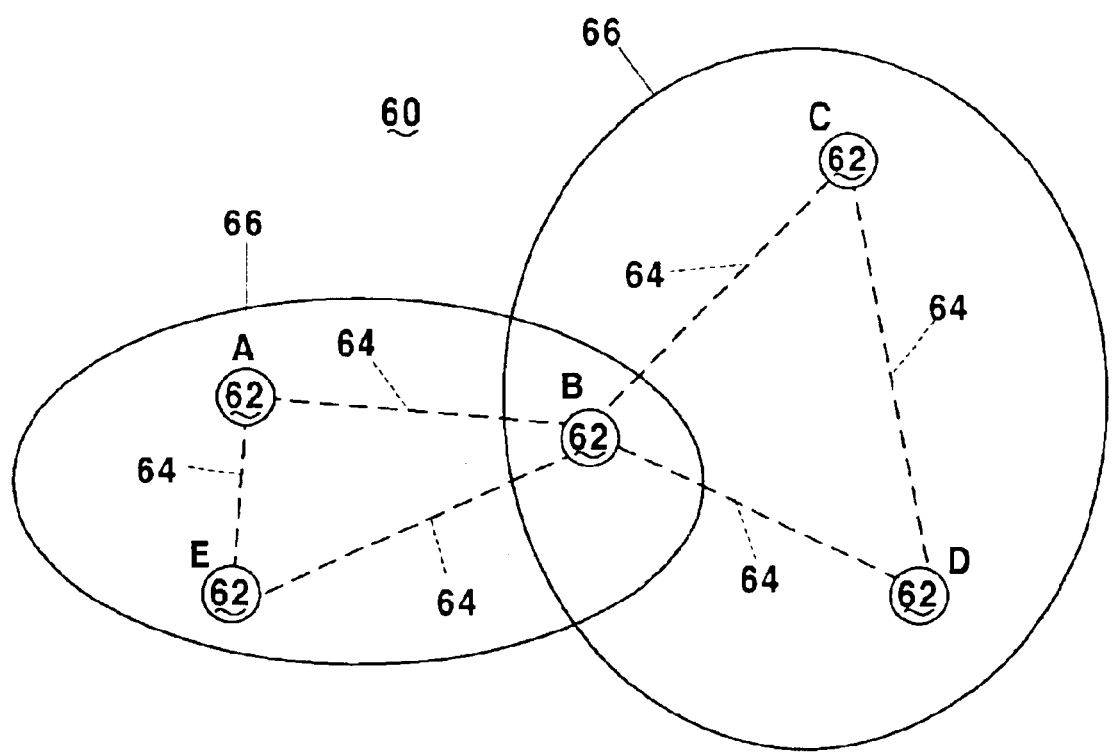
Figure 8:
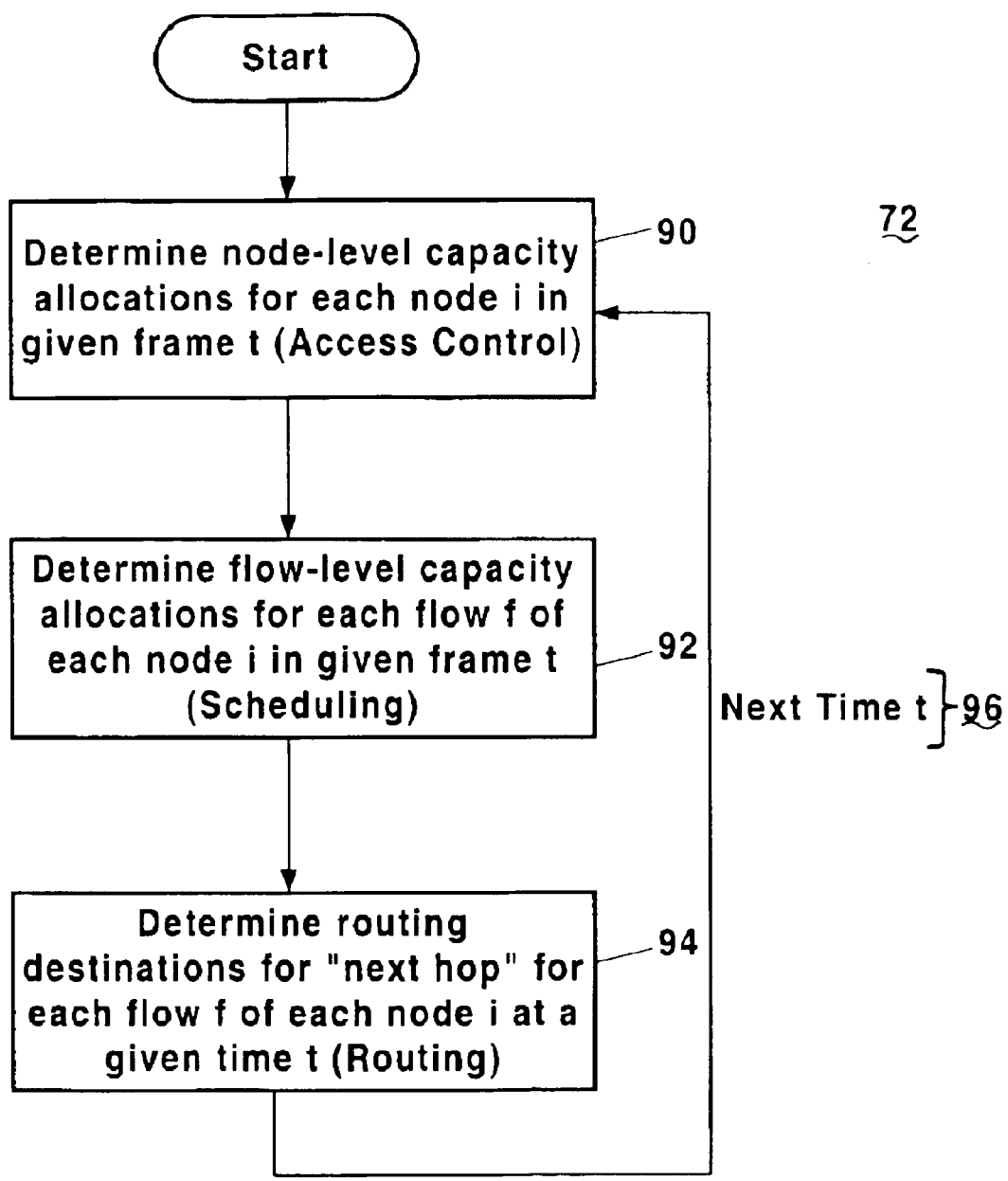
Figure 9:
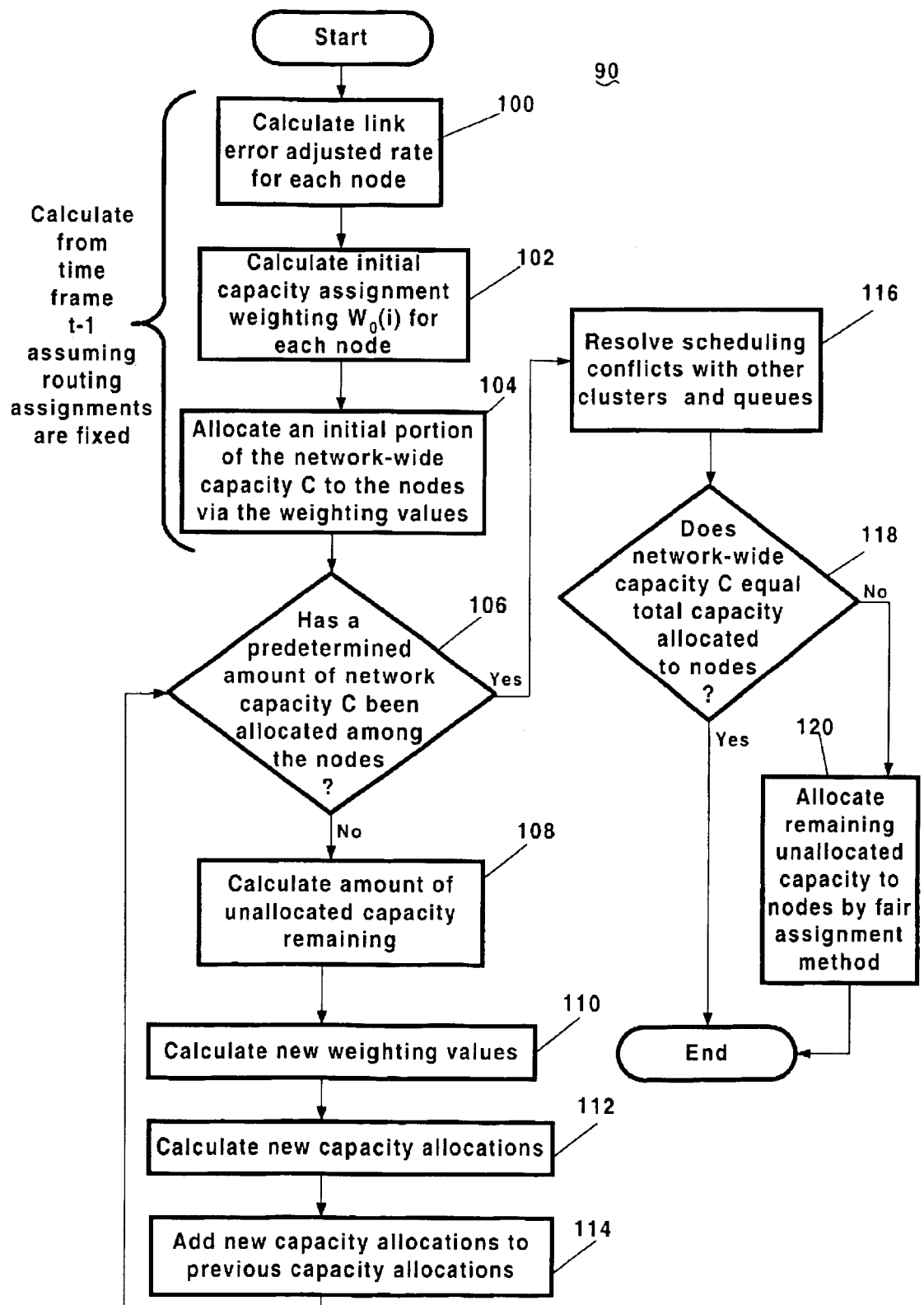
Figure 10:
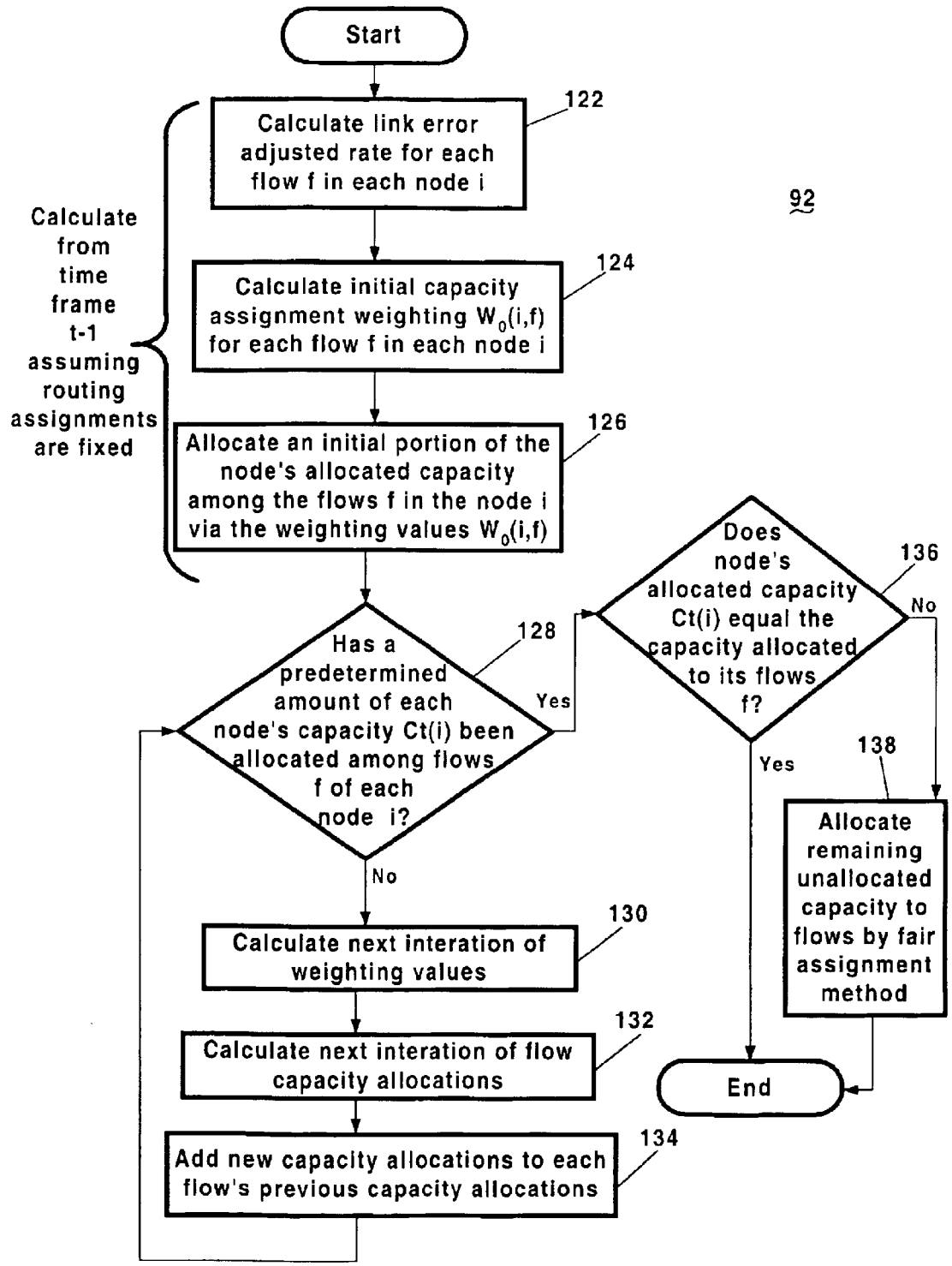
Figure 11:
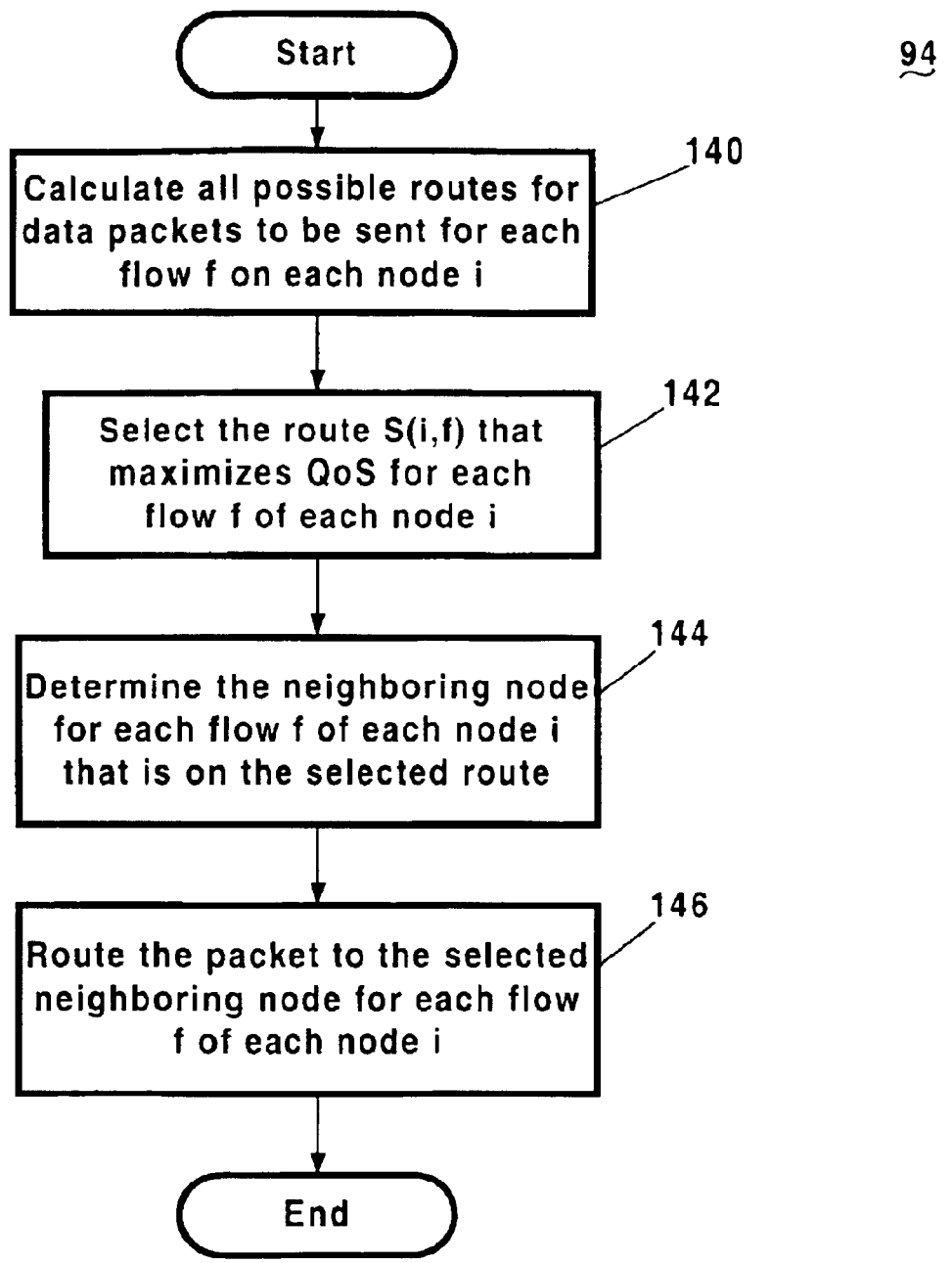

FIG. 7 is a simplified representation of the ad hoc wireless network shown in FIG. 3 wherein a pair of clusters encompass multiple nodes each interconnected by wireless links;

FIG. 8 is a flow chart representing the integrated protocol shown in FIG. 4 in greater detail, detailing steps of node-level capacity scheduling, flow-level capacity scheduling, and routing decisions;

FIG. 9 is a detailed flow chart of the node-level capacity scheduling step of FIG. 8;

FIG. 10 is a detailed flow chart of the flow-level capacity scheduling step of FIG. 8; and FIG. 11 is a detailed flow chart of the routing decisions step of FIG. 8.

DETAILED DESCRIPTION OF THE PREFERRED EMBODIMENTS

Referring to the drawings and to FIG. 4 in particular, a modified OSI protocol 70 is shown comprising the earlier-described conventional OSI protocol layers 42–54 but wherein the bottom three layers 42, 44 and 46 of the protocol 70 have been combined into a single QoS-maximizing protocol 72. The inventive protocol 72 integrates the previously-independent physical layer 42, link layer 44 and network layer 46 into a single protocol whereby scheduling, routing and access control decisions can be made interdependently upon the particular characteristics of the layers 42–46 and at a particular time.

In a shared medium such as a wireless network 60, the access control problem deals with the assignment and control of available bandwidth to nodes 62 in a cluster 68 or a clique 66. The inventive protocol 72 described here assigns bandwidth to nodes 62 in the network based on the traffic requirements at each node 62 (based on new traffic originating and flows f being routed through the node 62) as well the quality of the links 64 from a given node 62. This concept prevents the assignment of bandwidth to nodes 62 which have bad channel quality on links 64 to neighboring nodes 62 and thereby preventing loss in throughput and minimizing delay.

Access control under the integrated protocol 72 described herein considers the quality of a node's links 64 as well as loading at each node 62 which results from the routing algorithm. The integrated protocol 72 addresses the variability in an ad hoc network's topology and thereby solves the difficult routing problems as the connectivity between nodes 62 temporally changes. The routing solutions and the metrics used to make routing decisions of the inventive protocol 72 capture the effects of radio link quality between nodes 62 and the capacity assignment by the access control and scheduling mechanisms. This results in efficient route assignments leading to a decrease in congestion and increased throughput, thus enhancing QoS.

It has been found herein that the design of efficient protocols for wireless ad-hoc networks must address dependencies between the routing, access control and scheduling, and radio link functions. A unified solution is proposed that performs node level access control (referred to as node-level scheduling), flow-level scheduling and route assignment in a hierarchical framework with interactions among the three protocol solutions.

It will be understood that, although the features of the modified protocol 72 provide the best results and are most advantageous when employed in an ad hoc wireless networking environment, this invention can be employed in any wire-based, wireless, or any other known networking environment without departing from the scope of this invention.

The modified protocol 72, i.e., referred to herein as an integrated method for performing access control, scheduling and routing in a networked environment, will be described with respect to the ad hoc wireless network shown in the prior art FIG. 3 wherein the nodes 62 are interconnected by wireless links 64 in either a cliqued or a clustered environment, as shown by the example outlines 66 and 68, respectively. Packet transmission on the wireless network channel is shown generally in FIG. 5 wherein time 80 is organized into discrete frames 82 and each frame 82 has a number of slots 84 for transmitting discrete packets of data over the network. The inventive protocol 72 described herein determines which nodes 62 will be able to transmit over which links 64 by insertion of a packet into the slots 84.

The wireless network 60 can have half duplex characteristics, wherein only one node speaks at a time in a cluster and any hidden terminal problems are solved by RTS/CTS-like mechanisms. Each node 62 can handle multiple traffic "flows", each likely having different QoS attributes.

Figure 5:
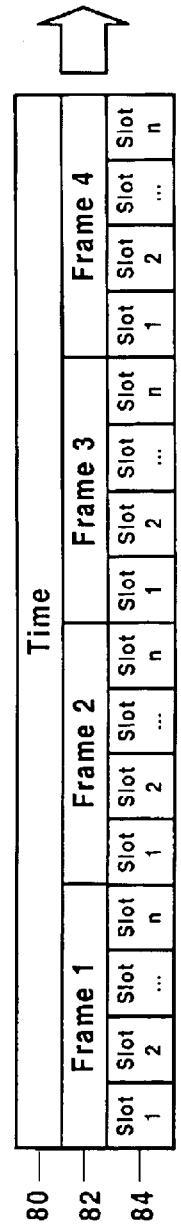
FIG. 5 is a schematic representation of a wireless carrier for an ad hoc wireless network such as that shown in FIGS. 3–4 in which time during which packets are transmitted on the network are delineated into time frames that, in turn, are sub-divided into discrete slots for transmitting data.
Figure 6:
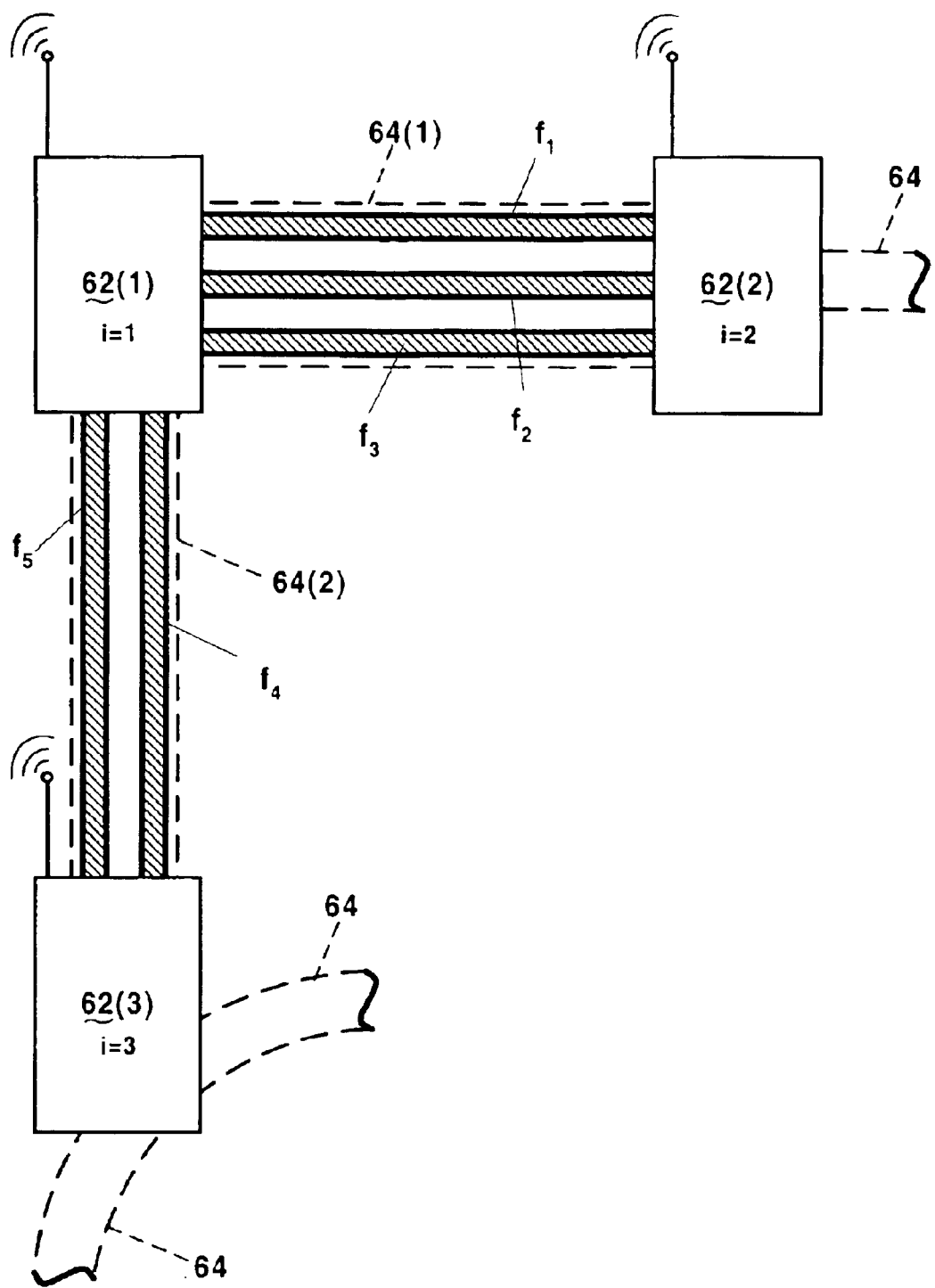
FIG. 6 is a enlarged view of three example nodes contained in the ad hoc wireless network shown in FIG. 3 wherein the nodes are interconnected to one another by the wireless links and each of the nodes is responsible for sending and receiving multiple flows.

For the purposes of this invention and as described in FIG. 6, the enumerator i will be under to indicate nodes 62 on the network 60. The enumerator f will be used to indicate flows between nodes 62 along links 64. In FIG. 5, the nodes 62 (for which i=1) is associated with five flows $f_1$ through $f_5$. The network 60 includes a routing function R(i,f)=j wherein the routing function R(i,f) returns j, the identity of the next node that a particular flow f associated with node i will be transmitted. For example, with reference to FIG. 6, if flow $f_2$ were to be transmitted from node 62(2) to node 62(3) via node 62(1), the routing function would be called as R(2,2) and would return 1, i.e., the identification of the next node on flow $f_2$'s path to node 62(3).

It is an important feature of this invention that the protocol 72 generates a "node-level" capacity schedule identified by the enumerator $C_t(i)$ which designates the amount of network-wide channel capacity ($C_t$) allocated to node i at a given time frame t. The protocol also generates a sub-schedule of the node-level schedule for each of the flows f emanating from a particular node i. This sub-schedule is indicated by $C_t(i,f)$ which is the amount of capacity allocated to the node i by the node-level capacity schedule $C_t(i)$ allocated among each of the flows f therefor for a given time t. This second schedule is referred to herein as a flow-level schedule and the sum of the flow-level schedule for a node i ($C_t(i, f)$) preferably approaches the node-level schedule for that node i ($C_t(i)$) for a preferably full allocation for node i and a given time t. The inventive protocol 72 of this invention generates the node-level schedules, flow-level schedules and routing destinations for packets transmitted in the network.

According to the invention, this integrated protocol 72 solves the capacity allocation at both the node level ($C_t(i)$) and the flow level ($C_t(i,f)$) and the routing problems in wireless ad-hoc networks, thus integrating the scheduling, routing and access control algorithms—typically separated by independent consideration in the past. The integrated protocol 72 manages delays due to localized congestion at particular nodes 62 and packet loss due to error-prone wireless links 64 to provide improved end-to-end delay/throughput, thus improving the QoS for the network 60.

A hierarchical scheme for node-level access control and flow-level scheduling is defined. At both the node and flow levels, a scheduling discipline is provided that is a modified weighted fair queuing scheme that uses a weight estimate derived from the link quality of the route (referred to herein as a "link error adjusted rate" or LEAR) and a route assignment determined by a routing algorithm. Routing (R(i,f)=j) is based on a shortest path algorithm that uses a delay estimate as a link distance metric, which in turn depends on capacity allocations from the hierarchical scheduling. The capacity allocations to the nodes 62 and flows f and the route assignments for the flows are iterated every time frame t. The adaptability and interactions among protocol layers in this integrated protocol 72 allows the network 60 to respond to random channel errors and congestion arising from flows f. The scheduling and routing algorithms are distributed among the nodes, thus, a centralized routing, access control and/or scheduler is not needed.

The integrated protocol 72 leverages recent prior art in scheduling and admission control techniques as well as routing methods proposed for wireless channels. Prior art link management techniques for packet networks: (1) highlight the importance of different admission control and scheduling techniques such as well-known scheduling algorithms that support multi-media services in wireline networks (Generalized Processor Sharing also called Weighted Fair Queuing WFQ and a whole body of algorithms called generalized Guaranteed Rate Scheduling Algorithms); and (2) note that scheduling algorithms that work well in wireline networks do not carry over their properties to the wireless environment (in fact, most have been shown to lose their desirable properties such as fairness and tight delay bounds in varying capacity channels).

The integrated protocol 72 described herein adapts these prior art scheduling algorithms such as Weighted Fair Queuing (WFQ) to a wireless channel by arbitrating among flows with good and bad channel error attributes differently. Routing algorithms have conventionally been designed with assumptions of links with known capacity and error performance. Variations in a link's capacity due to the channel characteristics or access control protocols are generally not reflected in routing metrics. One attempt to associate routing with the link quality is the concept of Least Resistance Routing which uses link quality as a metric to determine routes for flows, however, this LRR does not consider end-to-end delay performance.

The integrated protocol 72 described herein proposes a hierarchical scheme that considers a wireless channel shared by multiple nodes 62. Capacity allocation is made at the node level ($C_f(i)$) and the flow level ($C_f(i,f)$) based on link- and flow-level error characteristics and the routing assignment (R(i,f)=j). The routing itself is determined from a link-distance metric which is calculated based on congestion information and on the current node 62 and flow level schedules at each node 62. The nodes 62 do not have global knowledge of the network parameters and rely on selected information that is exchanged between them to make the scheduling and routing decisions in a distributed fashion as desired in ad-hoc networks 60.

FIG. 7 shows another example of a wireless network 60 having a simple topology for purposes of explaining the integrated protocol 72 of the instant invention. The network 60 has six nodes, labeled with reference numerals 62 and unique identifying letters A through E. The nodes 62(A–E) are organized into a pair of cliques 66, wherein node 62(B) is the only node overlapping between the two cliques 66 (i.e., one clique 66 has nodes A, B and E and the other clique 66 has nodes B, C and D). Wireless links 64 are defined between the various nodes 62 on the network 60 and are identified by the unique identifying letters for the pair of nodes 62 a particular link 64 interconnects (e.g., link 64(CB) extends between nodes C and B).

It will be understood that clusters 68 and cliques 66 are well-known in ad-hoc wireless networks 60 and the nodes 62 thereof are organized into clusters/cliques by a known algorithm. The operational environment consists of shared radio links 64 with nodes 62 operating in half-duplex mode, i.e., the nodes 62 can transmit and receive data but cannot do both simultaneously. The nodes 62 belonging to more than one cluster or clique can receive packets from only a single node 62 in each cluster 66 but not from multiple clusters 66 simultaneously.

For example, with reference to FIG. 7, node B can receive packets from nodes A and C but not from C and D in the same time slot. This assumption shall not be interpreted as being limiting on the invention since multiple packet receptions from different clusters is possible if the nodes 62 are provided with the ability to receive and discriminate between multiple transmissions, e.g., with directional antennas and multiple receiver elements and the clusters are organized to isolate interference. No hierarchy is assumed among the nodes 62 of a cluster and all nodes 62 are equal for purposes of bandwidth allocation and routing. Time 80 is slotted and slots 84 are grouped into fixed length frames 82 as described with respect to FIG. 5. It is assumed that the worst-case scenario of a single packet being transmitted per slot 84. Allocations of slots 84 to nodes 62 and to flows f, and route selection of the flows f, is performed at the beginning of each frame 82.

The main steps of the method embodied in the integrated protocol 72 are shown in FIG. 8 regarding the specific approach to solving the node access, flow scheduling and routing concerns in an ad hoc wireless network.

First and as shown by reference numeral 90, at the beginning of a particular time frame t, the capacity allocation $C_f(i)$ (i.e., what portion of the network- or channel-wide capacity C) is determined for each node 62 in the cluster based on a modified weighted fair queuing scheme assuming fixed routing assignments for all flows f in each node 62 for that given time frame t. The access control of nodes 62 sharing the radio link 64 within a cluster is referred to herein as "node-level scheduling".

Second and as shown by reference numeral 92, the capacity allocation $C_f(i)$ for each node 62 is sub-allocated to each flow f in the node 62, i.e., $C_f(i,f)$, based on a modified weighted fair queuing scheme assuming fixed routing assignments for all flows f in that node 62 for that given time frame t. This is referred to herein as "flow level scheduling".

Third and as shown by reference numeral 94, the next-hop routes j of each of the flows f at each node 62 are determined, i.e., for all the flows f in a particular node 62 determine which of the nearest neighboring nodes 62 the flow f must be directed to.

These three steps 90, 92 and 94 are performed at the beginning of each time frame t and are re-computed, i.e., the capacity allocation (node level scheduling followed by flow level scheduling), and iterated over the routing and schedule assignments for subsequent time frames t.

Flows f within a frame 82 might be interleaved in order to prevent block errors from selectively affecting a single flow f. This means that slots 84 assigned to a single flow f in a frame 82 need not be contiguous. The node- and flow-level scheduling is performed by a modified WFQ algorithm. Each node 62 estimates the channel quality on each of its associated flows f in terms of loss in throughput.

For instance, with reference to FIG. 7, assume that node C has flows directed to both B and D. Under the integrated protocol 72, node C estimates loss in capacity due to channel errors for the flows f directed to B and to D. The link error adjusted rate (LEAR) required by node C is then computed by adding the average error-free service rates required by all flows f plus the lost throughput of all its links 64 weighted in the proportion of flows directed to that destination.

More specifically, $X_t(CD)$ represents the packet transmissions per frame required from C to D in frame t and $X_t(CB)$ represents the packet transmissions required from C to B in frame t, and $Y_t(CD)$ represents the lost packets per frame on link CD during time frame t and $Y_t(CB)$ the lost frames on link CB, the LEAR value is computed as follows:

$$LEAR_t(C) = X_t(CB) + X_t(CD) + Y_{t-1}(CD) \times \frac{X_t(CD)}{X_t(CD) + X_t(CB)} + Y_{t-1}(CB) \times \frac{X_t(CB)}{X_t(CB) + X_t(CD)}$$

The weights of the scheduler are then determined in proportion to the LEAR values of each node 62 rather than the average rate required. The two variables X and Y capture two different effects. While X models the congestion level at each node, Y estimates the link quality between a node 62 and its neighboring nodes 62. As congestion increases in a node 62, the values of the X variable increase and the node demands a higher share of the bandwidth.

Also, the LEAR value increases as Y increases or, necessarily, as the link quality decreases. The node 62 thus tries to compensate for lost throughput by using higher bandwidth. This appears to be inefficient since nodes 62 with poor quality links 64 might "hog" bandwidth and throughput is lost. This is prevented by the routing mechanisms that avoid loading links 64 of poor quality. Also, as the queues in neighboring nodes 62 increase, their X values increase and they obtain more bandwidth, preventing starvation. This is a method for lag-lead compensation, as flows f which are lagging have higher values of the LEAR measure and obtain higher bandwidth.

In the determination of the node and flow capacity allocations, note that the route assignments are fixed: i.e. each node 62 knows the immediate next-hop neighbor for each flow f. At the end of each time frame t, routes are recomputed (under the routing function R(i,f)=j) based on the current node- and flow-level schedules, and are used in the subsequent time frame t.

In order to determine the route j for each flow f, each link 64 is associated with an adaptive distance-metric (i.e., the cost of transmitting over that link 64) and uses a distributed version of a well-known shortest path computation algorithm (such as a Bellman-Ford shortest path computation algorithm). It is preferable to select link metrics in a way that preference is given to: (1) neighboring nodes 62 with lower congestion (smaller aggregate queue size); and (2) links 64 with a lower estimated service time.

The metric proposed herein in accordance with the routing portion of the integrated protocol 72 is proportional to the estimate of the delay (predicted service time) and inversely proportional to the capacity allocation of flows f. Since the capacity allocations capture the effect of congestion at a node 62 as well as the quality of links 64 from that node 62, the routing metric captures the desired radio link performance and access control effects. To determine the proper route, this metric is summed for all nodes 62 along a route R for the flow f and the route and neighbor that minimizes the metric is chosen.

The specifics of the integrated protocol 72 will now be described in greater detail. With reference to the example topologies for an ad hoc wireless network 60 shown in FIGS. 3, 6 and 7, the nodes 62 are organized into cliques 66 or clusters 68 and a node 62 can belong to more than one cluster/clique. Each node 62 handles multiple traffic flows f, each of which has a specific source and destination. The following representations are used in the follow paragraphs to more particularly describe the steps 90–96 making up the integrated protocol 72 of the invention:

$T_f$ represents the length of time frame t in slots.

$X_t(i)$ is the total number of packets that need to be transmitted in frame t at node i (packets per frame), aggregated over all flows on all routes from i.

$X_t(i,j)$ represents the total number of packets that need to be transmitted in frame t from node i to j, aggregated over all flows on this route.

$X_t^f(i,j)$ is the total number of packets that need to be transmitted in frame t by flow f from node i to node j.

$Y_t(i,j)$ is the lost throughput (packets per frame) from node i to j, due to channel errors.

Y is a measure of link quality.

$Y_t^f(i,j)$ is the lost throughput for flow f from node i to j.

C is the total capacity available to all nodes in the cluster (slots per frame).

$C_t(i)$ is the capacity assigned to node i after node level scheduling.

$C_t^f(i)$ is the capacity assigned to flow f of node i after flow level scheduling.

$N_t(i)$ is the set of neighbors of node i.

$R_t(i,f)$ is the neighbor receiving flow f from node i (Route of f=i to R(i,f)).

S(i, f) is the optimal route (end-to-end) for node i, flow f wherein a route is a list of nodes 62 the flow f traverses from source to destination.

G(i,f) is a set of all possible routes for the flow f from node i.

t is used to denote time frame t for all the above quantities.

All of the nodes 62 in a cluster share the link 64 during a time frame t. Nodes 62 belonging to more than one cluster participate in the node level scheduling in each cluster and hence might obtain different allocation of slots for the time frame t. The node scheduling protocol <90> must resolve this conflict. For example, in FIG. 7, node B belongs to the cluster BCD as well as ABE. The time slots 84 assigned to B in the time frame t by considering nodes 62 in cluster BCD may be different from the allocation to B from the scheduling of nodes 62 in ABE. The number of slots B is allowed to transmit should not violate the allocations to nodes in either cluster (i.e., cause collisions). In this case, this is done by assigning the minimum amount of capacity allocated to a node 62 that appears in multiple clusters/cliques (e.g., in this case, node B would be assigned the minimum value of the node-level schedule of clusters ABE and BCD).

The first step 90 in the integrated protocol 72 will now be described in greater detail with reference to FIGS. 8–9. We propose a novel modification and use of the weighted fair queuing mechanism. The slots 84 in a time frame 82 are assigned to the nodes 62 in a cluster 68. Initially, different clusters 68 independently perform the capacity allocation for nodes 62 in their cluster 68. The allocation is performed in several steps, as described below:

The link error adjusted rate LEAR(i) is first calculated <100> for each node i at the beginning of a time frame t for all nodes in a cluster as:

$$LEAR_t(i) = \sum_{j \in N_t(i)} X_t(i, j) + \sum_{j \in N(i)} Y_{t-1}(i, j) \times \frac{X(i, j)}{\sum_{k \in N_t(i)} X(i, k)}$$

The first term in the LEAR(i) equation above is the total number of packets needed to be transmitted by node i to its neighbors (i.e., $j \in N_t(i)$) during the time frame t. The second term in the equation is the total number of packet errors in the previous time frame (i.e., t−1) on that particular link $Y_{t-1}(i,j)$, weighted by the proportion of the packets needed to be transmitted in the current time frame t on that particular link (i.e., X(i,j)) over the portion of packets needed to be transmitted by all of the links from a node to the node's neighbors (i.e., the sum of X(i,k) where k is an element of the neighboring nodes of node i). Thus, the first term of the LEAR(i) calculation provides a measure of the packet backlog at node i, while the second term provides a measure of the link quality wherein nodes with large backlogs and large error rates will be granted the highest LEAR(i) values, and nodes with small backlogs and low error rates will be assigned the lowest LEAR(i) values.

It will be understood that, when a clustering algorithm is employed in the organization of a wireless network 60, the terms "cluster" and the $N_t(i)$ set of elements corresponding to all neighboring nodes of a node 62 are different sets. However, when a cliquing algorithm is employed, $N_t(i)$ ·cluster. Therefore, in the equations provided herein, the terminology used in the different equations is for a clustering algorithm wherein it is necessary to calculate different sets for clusters and a node's neighbors. However, these equations can also be employed with a cliquing algorithm by merely substituting $N_t(i)$ for "cluster" interchangeably in the equations.

In the next step <102>, an initial capacity allocation weighting value is calculate for each node i in a cluster/clique:

$$W_{t,o}(i) = \frac{LEAR_t(i)}{\sum_{j \in cluster} LEAR_t(j)}$$

The $W_0(i)$ value represents the proportion of the total calculated LEARs for each node i in the cluster/clique and will be a real number between 0 and 1.

Then, an initial portion of the network-wide time-frame capacity C is assigned to each node i in the cluster/clique by multiplying the network-wide capacity C <104> by the initial weighting value $W_0(i)$ in the following manner:

$$C_{t,0}(i) = \lfloor C \times W_0(i) \rfloor$$

The bracket notation above is for an integer "floor" function, often noted as a TRUNC ( ) or INT ( ) functions in general programming syntax. This needs to be done because the network-wide capacity is given as an integer number of discrete slots per frame and, since the $W_0(i)$ value is typically a fractional real number, the integer portion of the resulting product of these two terms.

Thus, because the product $C_{t,0}(i)$ is reduced to its integer portion, some portion of the entire network-wide capacity C may remain unallocated. This is tested at decision point <106> in FIG. 9.

If the test at <106> fails, the method contemplates additional iterations to assign the remaining unallocated capacity (i.e., $C - \Sigma \lfloor C \times W_0(i) \rfloor$ is greater than or equal to a predetermined threshold point 1). The method then goes on to perform subsequent capacity allocations beyond step 0 (i.e., step n) of the remaining unallocated capacity. First, a new set of weighting values for iteration step n are calculated by first calculating the unallocated capacity remaining <108>:

$$C_{unallocated} = C - \sum_{j \in cluster} C_{t,n-1}(j)$$

Then, the new weighting values $W_n(i)$ are calculated for each node i in the cluster/clique <110>:

$$W_{t,n}(i) = W_{t,n-1}(i) \left[ C - \sum_{j \in cluster} C_{t,n-2}(j) \right] - C_{t,n-1}(i)$$

The new weighting values $W_{t,n}(i)$ for each node i are made up of two terms. The first term multiplies the node i previous iteration step (n−1) weighting value $W_{t,n-1}(i)$ by the amount of unallocated capacity before the previous step, i.e., iteration step n−2. The first term therefore represents the amount of capacity the node i requested to receive before the previous iteration (i.e., n−2). The second term subtracts the amount of actual capacity the node i actually received after the last iteration step (i.e., n−1). The new weighting values $W_{t,n}(i)$ for step n therefore adjust the weighting values from the previous step based upon previous allocations of capacity and set "hungry" nodes to receive additional capacity.

Then, the step n unallocated capacity allocations to each node i in the cluster/clique are performed as <112>:

$$C_{t,n}(i) = \lfloor C_{unallocated} \times W_{t,n}(i) \rfloor + \sum_{k=0}^{n-1} C_{t,k}(i)$$

The first term of the above unallocated capacity allocation equation uses the floor function again to assign a portion of the unallocated capacity to each of the nodes i in the cluster/clique based upon the new weighting values $W_{t,n}(i)$ calculated for step n above. The second term of the above equation adds the sum of all previous allocations to that node i from previous iterations (i.e., steps 0 through n−1) <114>.

The method returns to decision point <106> to test whether the capacity allocation should terminate, that is, when:

$$C - \sum_{j \in cluster} C_{t,n}(j) \leq 0 \text{ or } 1.$$

If additional iterations n+1 . . . are needed to allocate the additional capacity, processing continues through steps <108>, <110>, <112> and <114> until the processing test at <106> is satisfied and substantially all of the network-wide capacity has been allocated.

Next, once the allocation routine has completed, processing moves to <116> to resolve any conflicts arising from different cluster-clique specific allocations made to any node i belonging to more than one cluster/clique so, at <116>, the final allocation to each multi-cluster/clique node i be the minimum of all the allocations made to that node:

$$C_t(i) = \underset{\substack{\text{clusters with} \\ \text{node } i}}{\text{Min}} (C_{t,n}(i))$$

Any excess capacity remaining in any unallocated network-wide (actually cluster/clique-wide) capacity C, including any excess slots in clusters/cliques where the allocation to a multi-cluster/clique node i exceeds the minimum, are reassigned to the other nodes i in the cluster/clique by using the procedure outlined above (modified Weighted Fair Queuing). It is preferable that any end-of-iteration assignments of unallocated capacity be made in a manner wherein a node i selected to receive the unallocated capacity is one in which its final weighting value would be maximized, that is, select the node i to receive the remaining (i.e., one slot) wherein:

$$\arg\left(\max_{j \in cluster}(W_{t,n}(j))\right)$$

It should be noted that the total number of packets that a node i needs to transmit to a neighboring node in a frame t is the sum of the packets of each flow f using the link j:

$$X_t(i, j) = \sum_{f:R(i,f)=j} X_t^f(i, j)$$

$$Y_t(i, j) = \sum_{f:R(i,f)=j} Y_t^f(i, j)$$

The next-hop destination values of the R(i,f) routing function are determined by the routing algorithm at the end of the previous time frame t−1. This routing assignment is assumed for the purposes of the node and flow level scheduling. Route assignments are then recomputed at the end of the frame.

An example of how the node-level scheduling step at <90> is performed will now be described. Referring to FIG. 7, the node-level scheduling for cluster 66 containing nodes A, B and C that are interconnected by links 64. For this example, it will be assumed that the packet backlog and previous timeframe link errors have resulted in link error adjusted rates of:

LEAR(A)=3;
LEAR(B)=2; and
LEAR(C)=1 and that the cluster has a capacity of 4 slots (i.e., C=4).

Thus, the following values would then be calculated during the various 0 though n iterations at the beginning of each time frame t:

TABLE 1

Iteration Steps for Calculated Values of Node-level Scheduling Example

| Iteration Step (n) | Calculated Variable | Value for Node A | Value for Node B | Value for Node C |
|---|---|---|---|---|
| 0 | LEAR(i) | 3 | 2 | 1 |
| 0 | $W_{t,0}(i)$ | ½ | ⅓ | ⅙ |
| 0 | $C_{t,0}(i)$ | 2 | 1 | 0 |
| 1 | $C_{unallocated} = 1$ | | | |
| 1 | $W_{t,1}(i)$ | 2 − 2 = 0 | ⅓ − 1 = ⅓ | ⅙ − 0 = ⅔ |
| 1 | $C_{t,1}(i)$ | 2 + 0 = 2 | 1 + 0 = 1 | 0 + 1 = 1 |
| Final Allocations | | 2 | 1 | 1 |

The flow-level scheduling step <92> in FIG. 8 is shown in greater detail in FIG. 10 and described in greater specificity below. It will be understood that, simply stated, the flow-level scheduling takes the capacity assigned to node i in the above node-level scheduling step <90> and suballocates the capacity assigned to node i for each of the flows f extending through node i at time t. The capacity allocated within the node i to each of the flows f thereof is made in a similar fashion with similar weight given to the allocations made with respect to the cluster/clique-wide allocation of capacity C made to each node i in the node-level scheduling step <90> and, thus, less detail is provided on the allocation of node's capacity among its various flows f, but the procedure is virtually the same as allocation of the network-wide capacity C to each of its nodes i.

The modified scheduling mechanism similar to the approach proposed for the node level scheduling is used to allocate a node i capacity $C_t(i)$ among the flows f thereof. The weight is calculated from a LEAR(i) (link error adjusted rate) sub-calculated for each of the flows f in the node i in the same manner the LEAR was calculated for the node <122>:

$$LEAR(i, f) = X_t^f(i, R(i, f)) + Y_{t-1}^f(i, R(i, f)) \times \frac{X_t^f(i, R(i, f))}{\sum_k X_t^k(i, R(i, k))}$$

The weighting value for each of the flows f in a particular node i is then calculated as follows to generation the proportion of the node i's capacity to be allocated to each of the flows f <124>:

$$W_0(i, f) = \frac{LEAR_t(i, f)}{\sum_{k \in \text{flow in node } i} LEAR_t(i, k)}$$

The initial capacity allocation of a node i's capacity $C_t(i)$ in iteration step n=0 is thereby given by <126>:

$$C_{t,0}^f(i) = \lfloor C_t(i) \times W_0(i,f) \rfloor$$

The process <92> then checks at decision point <128> whether a predetermined amount of the node i's capacity has been allocated among the flows f within each node i. If this test fails at <128>, processing moves to step <130> wherein the next iteration of weighting values $W_n(i,f)$ are calculated. To do so, the unallocated capacity of each node i is calculated to determine how much additional unallocated capacity can be distributed among the flows f of each node i:

$$C_{unallocated,t,n}(i) = C_t(i) - \sum_{j \in \text{flows in node } i} C_{t,n-1}(1, j)$$

Then, the new weighting values $W_n(i)$ are calculated for each flow f of the particular node i <130>:

$$W_{t,n}(i, f) = W_{t,n-1}(i, f)\left[C_t(i) - \sum_{j \in \text{flows in node } i} C_{t,n-2}(i, j)\right] - C_{t,n-1}(i, f)$$

Then, the step n iteration capacity allocations for each of the flows f in each node i is <132>, <134>:

$$C_{t,n}^f(i) = \lfloor C_{unallocated,t,n}(i) \times W_{t,n}(i, f) \rfloor + \sum_{k=0}^{n-1} C_{t,k}(i, f)$$

Processing then returns to decision point <128> to determine whether the capacity allocation for the flows f in each node i should terminate. This is done, again, by determining whether the amount of left over unallocated capacity within a node is less than a predetermined number of slots, i.e., when:

$$\sum_{\text{flows in node } i} C_{t,n}^f(i) - C \leq 0 \text{ or } 1 \text{ (a threshold)}.$$

Once the termination criterion is satisfied, processing moves to decision point <136> to determine whether any capacity for each node i remains unallocated. If not, processing in step <92> ends. If so, processing moves to step <138> wherein any remaining capacity is allocated in a manner which fairly allocates the remaining unallocated capacity, i.e.:

$$\arg\left(\max_{j \in \text{flows in node } i} W_{t,n}(i, j)\right)$$

Turning to the routing determination step <94> of FIG. 8 that is described in greater detail in FIG. 11, a link distance metric is proposed herein for each time t that is obtained from the frame length and the capacity assignments made by the scheduling algorithms at the node and flow levels in steps <90> and <92>. The shortest-path determination is made based—the well-known Bellman-Ford Algorithm <140>, <142> which uses the above defined metric, i.e.:

$$S(i, f) = \text{Min}_{S(i,f) \in G(i,f)}\left(\sum_{k \in S(i,f)} \frac{T_f}{C^f(k)}\right)$$

As explained above, the term S(i,f) is the optimal (minimum of the cost defined by the sum of the ratio) node-to-node route for a flow from beginning to end and it is defined as the route that minimizes the metric of $T_f$ over $C^f(k)$ over the entire route. It is one of the possible routes from the set G(i,f) Since $T_f$ is the length of the time frame and $C^f(k)$ is the capacity assigned to the nodes along the route defined by S(i,f), the route will be defined by the nodes which minimize this fraction, i.e., the lowest time frame coupled with the highest capacities along the route will be selected from all possible routes.

The "next-hop", i.e., the next node on the selected route for each flow f of each node i is then selected by selecting the neighbor of the node i (i.e., j∈N(i)) <144> that is also on the selected most efficient route for that flow (i.e., j∈S(i,f) <142>, i.e.:

R(i,f)=j∈N(i), j∈S(i,f)

The data packet is then routed to the node j selected by the step <94> as shown in FIG. 11 <146>. After each frame, the steps <90>, <92> and <94> are repeated iteratively. Note that the input to one of the steps <90>, <92>, <94> of the integrated protocol 72 each require the outcome from the previous step and from the last time frame t. That is, the initial node-level and flow-level scheduling steps <90> and <92> respectively, take the input from the previous routing steps in the previous time frame. Then, once the node-level and flow-level scheduling is completed including the step of determining whether any additional access control needs to be performed in this time frame, the routing algorithm is recomputed based upon this time frame's node- and flow-level scheduling. Note that the method described is independent of the actual metric being used to do the routing, even though one possible metric is defined herein.

An important aspect of the integrated protocol 72 is the frame-by-frame iteration of the node level access, flow level schedule and routing. Note that in frame t+1, the node level scheduling method <90> uses the flow level schedules <92> and routes <94> determined in the previous frame t and produces a new node level schedule <90>. This, in turn, changes the flow level schedule <92> in frame t+1 and hence the actual routes R as determined by the routing method in frame t+1. Therefore, the schedules and the routes change possibly on a frame-by-frame basis thereby enabling rapid adaptability to topology changes in the networks, degradations in wireless channel performance and localized traffic congestion at different nodes. It should be noted that FIGS. 9–11 show that the routes determined in time frame t−1 at <94> are used as the starting point going into the process of node and flow scheduling for frame t as shown by <90> and <92> by the first three boxes in the methods shown therein.

The integrated protocol 72 described herein provides great benefits over prior art protocols, especially in the area of performing scheduling, routing and access control in ad hoc wireless networks. This approach that integrates access control, scheduling and routing protocols for ad-hoc networks is fully distributed among the nodes and flows of the network and is highly adaptive to dynamic changes to the network. The protocol 72 is very robust, i.e., it can combat poor link quality and loss of nodes with immediate corrections. Results of modeling this protocol 72 indicate a huge margin of improvement in delay/throughput performance, thus enhancing QoS. The LEAR scheduler also has several key attributes, including that it combats localized congestion arising in nodes by adjusting schedules and routes, it combats loss of nodes (re-clustering), it combats bad channel quality, and has desirable fairness and desirable lag/lead properties.

While the invention has been specifically described in connection with certain specific embodiments thereof, it is to be understood that this by way of illustration and not limitation, and the scope of the appended claims should be construed as broadly as the prior art will permit.

What is claimed is:

1. An integrated highly adaptive method to perform scheduling, routing and access control in a network, the network made up of a plurality of nodes interconnected by links between at least some of the nodes wherein at least one path interconnects all of the plurality of nodes, wherein the nodes are organized into at least one of a cluster and a clique, the network having a network-wide capacity to send data packets in slots delineating time frames on the network between the nodes on the network defined by the links, the plurality of nodes being configured to process at least one flow, a flow comprising at least a portion of a transmitted and received data packet for which the plurality of nodes must manage to get the data packets to a desired node on the network, the method comprising the step of:

allocating the network-wide capacity among each of the nodes in the at least one of a cluster and a clique at the beginning of a time frame on the network, wherein the network-wide capacity allocated to each of the nodes in the at least one of a cluster and a clique is performed based upon at least one node-level performance metric of the network; and repeating the capacity allocating step at the beginning of each time frame.

2. The method of claim 1 and further comprising the step of allocating the capacity allocated to each node in the at least one of a cluster and a clique among each of the flows associated with that node at the beginning of a time frame on the network, wherein the capacity allocated to each of the flows in the node is performed based upon at least one flow-level performance metric of the network.

3. The method of claim 2 and further comprising the step of routing the flow associated with each node to a neighboring node.

4. The method of claim 3 wherein the routing step further comprises the step of computing all possible routes of that a flow can take to its destination and selecting a desired route based upon at least one routing performance metric of the network.

5. The method of claim 4 wherein the routing step further comprises the step of selecting the neighboring node for each flow of each node that lies on the desired route.

6. The method of claim 5 wherein the at least one node-level performance metric comprises a measure of the backlog of packets to be sent by a node and the node-level performance metric is measured independently for each node in the at least one of a cluster and a clique.

7. The method of claim 6 wherein the at least one node-level performance metric further comprises a measure of the link errors experienced in the previous time frame by a node and the performance metric is measured independently for each node in the at least one of a cluster and a clique.

8. The method of claim 7 wherein the at least one flow-level performance metric comprises a measure of the backlog of packets to be sent by a node and the node-level performance metric is measured independently for each node in the at least one of a cluster and a clique.

9. The method of claim 8 wherein the at least one flow-level performance metric further comprises a measure of the link errors experienced in the previous time frame by a node and the performance metric is measured independently for each node in the at least one of a cluster and a clique.

10. The method of claim 1 wherein the step of allocating the capacity of the network further comprises the step of calculating a link error adjusted rate for each node in the at least one of a cluster and a clique, wherein the link error adjusted rate is representative of the node-level performance metric.

11. The method of claim 10 and further comprising the step of calculating a weighting value for each node corresponding to a representative portion of the link error adjusted rate of the node as compared with the sum of the link error adjusted rate for the corresponding at least one of a cluster and a clique.

12. The method of claim 11 and further comprising the step of allocating capacity among the nodes in the at least one of a cluster and a clique by integrally calculating the product of the capacity of the at least one of a cluster and clique with the weighting value for each node.

13. The method of claim 12 and further comprising the step of determining whether any of the capacity of the at least one of a cluster and a clique remains unallocated among the nodes of the at least one of a cluster and a clique.

14. The method of claim 13 and further comprising the step of allocating any unallocated capacity to a node having a highest weighting value from a previous iteration if the unallocated capacity is less than a predetermined threshold value.

15. The method of claim 2 wherein the step of allocating the capacity of the node further comprises the step of calculating a link error adjusted rate for each flow in the node, wherein the link error adjusted rate is representative of the flow-level performance metric.

16. The method of claim 15 and further comprising the step of calculating a weighting value for each flow corresponding to a representative portion of the link error adjusted rate of the flow as compared with the sum of the link error adjusted rate for the corresponding node.

17. The method of claim 16 and further comprising the step of allocating capacity among the flows in the node by integrally calculating the product of the capacity of the node with the weighting value for each flow.

18. The method of claim 17 and further comprising the step of determining whether any of the capacity of the node remains unallocated among the flows of the node.

19. The method of claim 18 and further comprising the step of allocating any unallocated capacity to a flow having a highest weighting value from a previous iteration if the unallocated capacity of the node is less than a predetermined threshold value.

20. The method of claim 4 and further comprising the step of computing a most efficient route for each flow based upon the at least one routing performance metric of the network.

21. The method of claim 20 wherein the routing performance metric comprises the sum of the time frame length divided by the capacity allocated to each node along the route, and the selected route comprises the minimum of the routing performance metric.

22. The method of claim 21 and further comprising the step of determining a neighboring node to the flow corresponding to the desired route.

23. In a highly adaptive integrated network for performing scheduling, routing and access control in a network comprising at least physical, link and network layers made up of a plurality of nodes interconnected by links between at least some of the nodes, wherein at least one path interconnects all of the plurality of nodes, wherein the nodes are organized into at least one of a cluster and a clique, the network including the capacity to send data packets in slots delineating time frames on the network between the nodes on the network defined by the links, the plurality of nodes being configured to process at least one flow, a flow comprising at least a portion of a transmitted and received data packet for which the plurality of nodes must manage to get the data packets to a desired node on the network, the improvement comprising:

the physical, link layer and network layers being interdependently integrated with one another by at least one of a scheduling, routing, and access control decision in a current time frame being made by relying on at least one of a scheduling, routing and access control decision made in a previous time frame.

24. The network of claim 23 wherein the physical layer is a wireless medium.

25. The network of claim 24 wherein the physical layer includes both wireless and wire-based media.

26. The network of claim 25 wherein at least one of the physical, link and network layers incorporate a node-level scheduling routine for allocating capacity among the plurality of nodes of the network.

27. The network of claim 26 wherein at least one of the physical, link and network layers incorporate a flow-level scheduling routine for allocating capacity each node among any flow corresponding to that node.

28. The network of claim 27 wherein the network layer incorporates a muting routine for determining a destination for the at least one flow of the plurality of nodes of the network based upon a characteristic of at least one of the physical and link layers.

29. The network of claim 23 wherein the physical layer includes both wireless and wire-based media.

30. The network of claim 23 wherein at least one of the physical, link and network layers incorporate a node-level scheduling routine for allocating capacity among the plurality of nodes of the network.

31. The network of claim 23 wherein at least one of the physical, link and network layers incorporate a flow-level scheduling routine for allocating capacity of each node among any flow corresponding to that node.

32. The network of claim 23 wherein the network layer incorporates a routing routine for determining a destination for any flow corresponding to each node based upon a characteristic of at least one of the physical and link layers.

33. In an improved, highly adaptive integrated network for performing scheduling, routing and access control in a network comprising at least physical, link and network layers made up of a plurality of nodes interconnected by links between at least some of the nodes, wherein at least one path interconnects all of the plurality of nodes, wherein the nodes are organized into at least one of a cluster and a clique, the network including a capacity to send data packets in slots delineating time frames on the network between the nodes on the network defined by the links, the plurality of nodes being configured to process at least one flow, a flow comprising at least a portion of a transmitted and received data packet for which the plurality of nodes must manage to get the data packets to a desired node on the network, the improvement comprising:

the physical, link layer and network layers being interdependently integrated with one another by at least one of a scheduling, routing, and access control decision in a current time frame being made by relying on at least one of a scheduling, routing and access control decision made in a previous time frame; and wherein the network layer incorporates a routing routine for determining a destination for the at least one flow processed by the plurality of nodes of the network based upon a characteristic of at least one of the physical and link layers.

34. In an improved, highly adaptive integrated network for performing scheduling, muting and access control in a network comprising at least physical, link and network layers made up of a plurality of nodes interconnected by links between at least some of the nodes, wherein at least one path interconnects all of the plurality of nodes, wherein the nodes are organized into at least one of a cluster and a clique, the network including a capacity to send data packets in slots delineating time frames on the network between the nodes on the network defined by the links, the plurality of nodes being configured to process at least one flow, a flow comprising at least a portion of a transmitted and received data packet for which the plurality of nodes must manage to get the data packets to a desired node on the network, the improvement comprising:

the physical, link layer and network layers being interdependently integrated with one another by at least one of a scheduling, routing, and access control decision in a current time frame being made by relying on at least one of a scheduling, routing and access control decision made in a previous time frame; and wherein the network layer incorporates a routing routine for determining a destination for any flow corresponding to each node based upon a characteristic of at least one of the physical and link layers.

35. An integrated highly adaptive method to perform scheduling, routing and access control in a network, the network made up of a plurality of nodes interconnected by links between at least some of the nodes wherein at least one path interconnects all of the plurality of nodes, wherein the nodes are organized into at least one of a cluster and a clique, the network having a network-wide capacity to send data packets in slots being grouped into fixed length time frames on the network between the nodes on the network defined by the links, the plurality of nodes being configured to process at least one flow, a flow comprising at least a portion of a transmitted and received data packet for which the plurality of nodes must manage to get the data packets to a desired node on the network, the method comprising the step of:

allocating the network-wide capacity among each of the nodes in the at least one of a cluster and a clique at the beginning of a fixed length time frame on the network, wherein the network-wide capacity allocated to each of the nodes in the at least one of a cluster and a clique is performed based upon at least one node-level performance metric of the network; and repeating the capacity allocating step at the beginning of each fixed length time frame.

36. In an improved, highly adaptive integrated network for performing scheduling, routing and access control in a network comprising at least physical, link and network layers made up of a plurality of nodes interconnected by links between at least some of the nodes, wherein at least one path interconnects all of the plurality of nodes, wherein the nodes are organized into at least one of a cluster and a clique, the network including a capacity to send data packets in slots delineating time frames on the network between the nodes on the network defined by the links, the plurality of nodes being configured to process at least one flow, a flow comprising at least a portion of a transmitted and received data packet for which the plurality of nodes must manage to get the data packets to a desired node on the network, the improvement comprising:

each of the slots being grouped into a fixed length time frame; and the physical, link layer and network layers being interdependency integrated with one another by at least one of a scheduling, routing, and access control decision in a current time frame being made by relying on at least one of a scheduling, routing and access control decision made in a previous time frame.

* * * * *